United States Patent [19]

Tanabe et al.

[11] Patent Number: 4,954,899
[45] Date of Patent: Sep. 4, 1990

[54] RECEPTION CONTROL APPARATUS FOR A TELEVISION RECEIVER

[75] Inventors: Toshiyuki Tanabe; Seiji Senoo, both of Saitama, Japan

[73] Assignee: Kabushiki Kaisha Toshiba, Kanagawa, Japan

[21] Appl. No.: 200,970

[22] Filed: Jun. 1, 1988

[30] Foreign Application Priority Data

Jun. 2, 1987 [JP] Japan ............................. 62-139303

[51] Int. Cl.$^5$ ........................... H04N 5/50; H04B 1/16
[52] U.S. Cl. .............................. 358/191.1; 358/194.1; 455/181; 455/186
[58] Field of Search ............... 358/191.1, 193.1, 194.1; 455/181, 184, 180

[56] References Cited

U.S. PATENT DOCUMENTS

| 3,800,230 | 3/1974 | Marks | 455/181 |
| 4,081,753 | 3/1978 | Miller | 325/396 |
| 4,228,543 | 10/1980 | Jackson | 358/191.1 |
| 4,593,414 | 6/1986 | Koyanagi | 455/186 |
| 4,706,121 | 11/1987 | Young | 455/181 |

FOREIGN PATENT DOCUMENTS 53-654 11/1978 Japan .

OTHER PUBLICATIONS

Karstad, "Microprocessor Control for Color-TV Receivers," IEEE Transactions on Consumer Electronics, vol. 26, No. 2, May 1980.
Patent Abstracts of Japan, vol. 7, No. 107 (E-147)[1252], May 11, 1983: & JP-A-58 29 276 (Kinoshita) 21-02-1983.

Primary Examiner—Tommy P. Chin
Attorney, Agent, or Firm—Finnegan, Henderson, Farabow, Garrett and Dunner

[57] ABSTRACT

A channel selection apparatus used for a television receiver for automatically selecting a predetermined TV channel along with a user's habit or reception pattern for a prescribed period. The channel selection apparatus includes an input device for commanding reception control data for the channel selection, a clock device for generating a time data, a memory device for storing reception control data supplied from the input device for a predetermined period together with time data responding to the reception control data to be stored, a control device for controlling the memory device for a writing reception control data and its responding time data thereto and a reading out predetermined reception control data with time data responding to the present time and an output device responsive to the control device for receiving the reception control data.

8 Claims, 6 Drawing Sheets

RECEPTION CONTROL APPARATUS FOR A TELEVISION RECEIVER

FIELD OF THE INVENTION

The present invention relates generally to a reception control apparatus used for a television receiver, and more particularly, to a reception control apparatus used for a television receiver, in which a reception control, e.g., a reception channel selection for a television receiver is automatically performed.

BACKGROUND OF THE INVENTION

In recent television receivers (referred as TV receivers), digital controls for a reception channel selection and a sound volume control are very popular.

Such a TV receiver has a keyboard for manual controls of the TV receiver, a microcomputer for performing digital controls of the TV receiver, a memory storing a variety of control data and a tuner. The keyboard is mounted on a front panel or a remote controller of the TV receiver. The microcomputer reads out a suitable operation data, e.g., a tuning voltage data from the memory in response to an operation of the keyboard. The memory is generally comprised of a read only memory (referred as ROM hereafter).

The operation data, e.g., the tuning voltage data read out from the ROM are converted to an analog tuning voltage by a conventional digital to analog converter (referred as D/A converter hereafter) and the analog tuning voltage is applied to the tuner. The tuner is generally comprised of a voltage synthesizer tuning circuit. The tuning voltage is applied to a variable capacitance diode in a resonant circuit of the tuner. Thus, the tuner performs a prescribed tuning for a desired TV reception channel designated by the keyboard.

In such a conventional TV receiver, there has been developed a reception control apparatus which is equipped with another memory. The second memory is comprised of a random access memory (referred as RAM hereafter) which temporarily stores an operation data read out from the ROM upon operation of the keyboard or at predetermined time intervals during the operation of the TV receiver.

The operation data stored in the RAM are held even after a power shut-off of the TV receiver. For the purpose, the RAM is always activated by a suitable auxiliary power supply source like a battery. Thus, a prescribed channel reception at the last power shut-off can be automatically restored at the power turn-on operation of the TV receiver.

An example of the conventional reception control apparatus for the TV receiver is shown in FIG. 1. FIG. 1 is a block diagram illustrating the conventional reception control apparatus. In FIG. 1, a keyboard 11 is coupled to a system controller 12. The keyboard 11 is conventionally equipped with a power controller, a channel controller and a volume controller, but they are not shown in the drawing. The power controller controls the turn-on or the shut-off of a main power supply source of the TV receiver. The channel controller controls the selection of the TV reception channels. The volume controller controls the loudness of sound from the TV receiver.

There are at least two types for the channel controller. One type of the channel controller has a prescribed number of channel keys associated to the TV reception channels, i.e., Ch-1, Ch-2, ..., Ch-12, Ch-U, respectively. Another type of the channel controller has two keys, one for raising the count of the channel numbers and another for lowering the count of the channel numbers. The volume controller has two keys for increasing and decreasing sound volume.

When any key on the keyboard 11 is operated by a user, the keyboard 11 outputs a reception control data D1 associated to the operated key.

The system controller 12 is constituted by a microcomputer. Necessary operations of the system controller 12 are performed, for example, by suitable software programmed in the microcomputer for operations as described later.

When a specified key on the keyboard 11 is operated, the system controller 12 reads out a specified operation data D2 from and ROM 13 coupled thereto, in response to the reception control data D1 associated to the operated key on the keyboard 11. The ROM 13 stores a plurality of the operation data D2. The plurality of the operation data D2 includes different voltage data, e.g., tuning voltage data D2-ch and volume voltage data D2-s. The tuning voltage data D2-ch, e.g., D2-1, D2-2, D2-3, ..., D2-12, D2-U correspond to the TV reception channels Ch-1, Ch-2, ..., Ch-12, Ch-U, respectively.

The tuning voltage data D2-ch and the volume voltage data D2-s read out from the ROM 13 are applied to a tuning circuit 14 and a volume control circuit 15 of a tuner 16 through a D/A converter, respectively. The D/A converter is not shown in the drawing, but is comprised in the system controller 12 as a part of the microcomputer. The D/A converter converts the digital tuning voltage data D2-ch or the volume control voltage data D2-s to a corresponding analog tuning voltage D3, e.g., an analog tuning voltage D3-ch or an analog volume control voltage D3-s.

The tuning voltage D3-ch is applied to a variable impedance device such as a variable capacitance diode comprising a resonant circuit of the tuning circuit 14. Thus, a desired TV reception channel is tuned by the tuning circuit 14 in response to the reception control data D1 designated to a specified channel key on the keyboard 11.

The volume control voltage D3-s is applied to a volume control circuit 15. Thus, a desired loudness is obtained in response to the reception control data D1 associated by the volume controller on the keyboard 11.

The system controller 12 is further coupled to an RAM 17 for temporarily storing the operation data D2 such the the tuning voltage data D2-ch and the volume control voltage data D2-s. The operation data D2 is applied to the RAM 17 at a prescribed time, as described later.

Referring now to FIG. 2, a reception channel selection routine of the system controller 12 in the course of the operation of the TV receiver. FIG. 2 is a flowchart showing the selection routine. The user of the TV receiver operates the channel controller of the keyboard 11 so that a prescribed reception control data D1 corresponding to his or her desired TV channel is applied to the system controller 12 (Step 2A).

The system controller 12 reads out a specified tuning voltage data D2-ch from the ROM 13 in response to the reception control data D1 applied from the keyboard 11 (Step 2B). The D/A converter comprised in the system controller 12 converts the tuning voltage data D2-ch of digital configuration to a corresponding tuning voltage D3-ch of analog configuration and then applies the tuning voltage D3-ch to the tuning circuit 14 of the tuner 16 (Step 2C). Thus, the desired TV channel program is received by the TV receiver.

The system controller 12 further applies the tuning voltage data D2-ch to the RAM 17 when the channel controller of the keyboard 11 is operated (Step 2D). The tuning voltage data D2-ch is temporarily stored in the RAM 17 (Step 2E). But, the tuning voltage data D2-ch, e.g., D2-3, stored in the RAM 17 is replaced by another tuning voltage data D2-ch, e.g., D2-5, when another operation for the channel controller of the keyboard 11 is made.

The RAM 17 is always activated by an auxiliary power supply source (not shown). Thus, the tuning voltage data D2-ch stored in the RAM 17 is held even after a main power supply source for the TV receiver is shut-off by the operation of the power controller on the keyboard 11.

Referring now to FIG. 3, an operation routine of the system controller 12 at the power turn-on operation of the TV receiver. FIG. 3 is a flowchart showing the operation routine. For the power turn-on of the TV receiver, the power controller on the keyboard 11 is operated by the user (Step 3A). Thus, a prescribed reception control data D1 is applied to the system controller 12. The system controller 12 automatically accesses the RAM 17 upon receipt of the reception control data D1 (Step 3B). Then, the system controller 12 reads out a tuning voltage data D2-ch from the RAM 117, which has been held at the last power shut-off operation of the TV receiver.

The D/A converter in the system controller 12 converts the tuning voltage data D2-ch of the digital configuration to a tuning voltage D3-ch of analog configuration and then applies the tuning voltage D3-ch to the tuning circuit 14 of the tuner 16 (Step 3C). Thus, a program at the TV channel received just before the last power shut-off operation is received by the TV receiver.

However, the conventional channel selection apparatus has a drawback as follows.

Generally, users have their own habit on the TV channel receptions through a day or a week. In their reception patterns due to the habit, desired reception channels are used to be different with each other, time by time in a day or a week. Therefore, a user wish to receive different TV channels for different times in a day or a week.

The conventional channel selection apparatus for a TV receiver is unable to satisfy such a demand according to the user's habit or the reception pattern in a day or a week.

SUMMARY OF THE INVENTION

It is, therefore, an object of the present invention to provide a channel selection apparatus for a TV receiver which is able to automatically select a predetermined TV channel along with a user's habit or reception pattern for a prescribed period.

In order to achieve the above object, a channel selection apparatus used for a TV receiver for automatically selecting a predetermined TV channel along with a user's habit or reception pattern for a prescribed period includes an input device for commanding reception control data for the channel selection, a clock device for generating a time data, a memory device for storing reception control data supplied from the input device for a predetermined period together with time data responding to the reception control data to be stored, a control device for controlling the memory device for a writing reception control data and its responding time data thereto and a reading out predetermined reception control data with time data responding to the present time and an output device responsive to the control device for receiving the reception control data.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
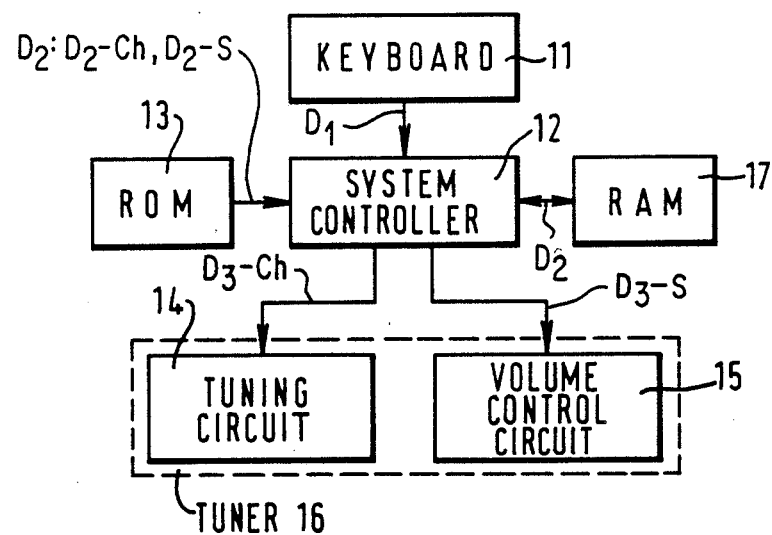
FIG. 1 is a block diagram showing an example of a conventional reception control apparatus for a TV receiver.

The present invention will be described in detail with reference to FIGS. 4 through 8. Throughout the drawings, reference numerals or letters used in FIGS. 1 to 3 will be used to designate like or equivalent elements or steps for simplicity of explanation.

Figure 4:
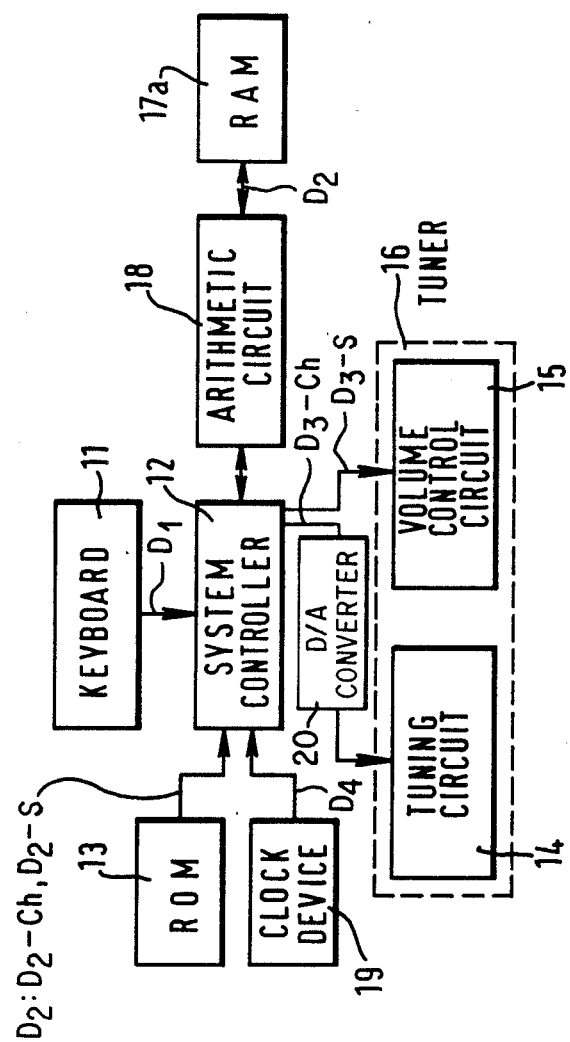
FIG. 4 is a block diagram showing an embodiment of a reception control apparatus for a TV receiver according to the present invention.

Referring now to FIG. 4, an embodiment of the reception control apparatus for a TV receiver according to the present invention will be described in detail. FIG. 4 is a block diagram illustrating the embodiment of the reception control apparatus. In FIG. 4, a keyboard 11 is coupled to a system controller 12. The keyboard 11 has a similar construction as the keyboard 11 of the conventional reception control apparatus, as shown in FIG. 1. That is, the keyboard 11 is equipped with a power controller, a channel controller and a volume controller. When any key on the keyboard 11 is operated by a user, the keyboard 11 outputs a reception control data D1 associated with the operated key.

The system controller 12 is constituted by a microcomputer, similar to the conventional reception control apparatus. Necessary operations of the system controller 12 for operations as described later or others are performed by suitable software programmed in the microcomputer.

The system controller 12 reads out a specified operation data D2 from a ROM 13 coupled to the system controller 12 in response to the reception control data D1 supplied from the keyboard 11. The ROM 13 stores a plurality of the operation data D2 such as turning voltage data D2-ch, the volume control voltage data D2-s and other necessary operation data. The operation data D2, e.g., the tuning voltage data D2-ch, include different voltage data D2-1, D2-2, D2-3, . . . , D2-12, D2-U and other data, which correspond to the TV reception channels Ch-1, Ch-2, . . . , Ch-12, Ch-U, respectively, as described before.

The tuning voltage data D2-ch read out from the ROM 13 is applied to a tuning circuit 14 of a tuner 16 through a D/A converter. The volume control voltage data D2-s read out from the ROM 13 is applied to a volume control circuit 15 of the tuner 16 through the D/A converter 20. The D/A converter 20 is included in the system controller 12 as a part of the microcomputer, similar to the conventional reception control apparatus. The D/A converter 20 converts the digital voltage data D2 such as the tuning voltage data D2-ch or the volume control voltage data D2-s to a corresponding analog tuning voltage D3, such as a tuning voltage D3-ch or a volume control voltage D3-s.

The tuning voltage D3-ch is applied to a variable impedance device such as a variable capacitance diode comprising a resonant circuit of the tuning circuit 14. Thus, a desired TV reception channel is tuned by the tuning circuit 14 in response to the reception control data D1 designated by the channel controller on the keyboard 11.

The volume control voltage D3-s is applied to the volume control circuit 15 of the tuner 16. Thus, a desired loudness of sound is obtained from the TV receiver in response to the reception control data D1 designated by the volume controller on the keyboard 11.

The system controller 12 is further coupled to an RAM 17a for storing a plurality of the operation data D2 such as the tuning voltage data D2-ch and the volume control voltage data D2-s through an arithmetic circuit 18. The RAM 17a has a sufficient capacity of memory area for storing the operation data D2 for a prescribed period, e.g., four weeks. The operation data D2 such as the tuning voltage data D2-ch and the volume control voltage data D2-s applied from the system controller 12 to the RAM 17a passes through the arithmetic circuit 18 as they are without any change.

The system controller 12 is further coupled to a clock device 19. The clock device 19 is constituted by a clock pulse generator and digital processing circuits such as pulse dividers, as conventional clock devices used in many fields. A clock pulse generated by the clock generator is processed through the digital processing circuits so that the clock device 19 continuously generates a present time data D4 of digital configuration. The present time data D4 is supplied to the system controller 12.

Figures 2, 3:
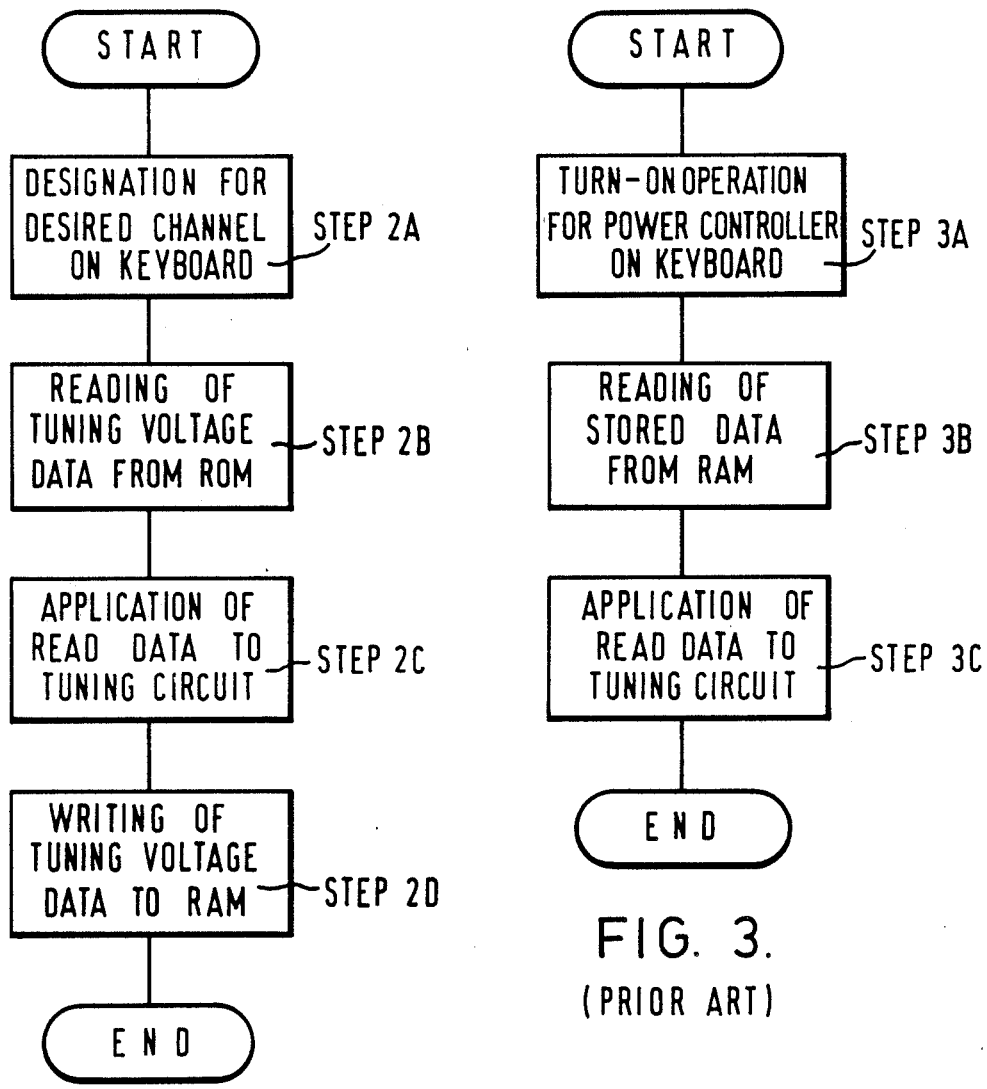
FIG. 2 is a flowchart showing a reception channel selection routine performed by the system controller 12 of FIG. 1.
FIG. 3 is a flowchart showing another operation routine performed by the system controller 12 of FIG. 1 at a power turn-on operation of a TV receiver.

A reception channel selection routine of the system controller 12 in the course of the operation of the TV receiver is performed, similar to the conventional reception control apparatus, as shown in FIG. 2. Therefore, the channel selection routine of the system controller 12 of the embodiment will be omitted from following descriptions.

Figure 5:
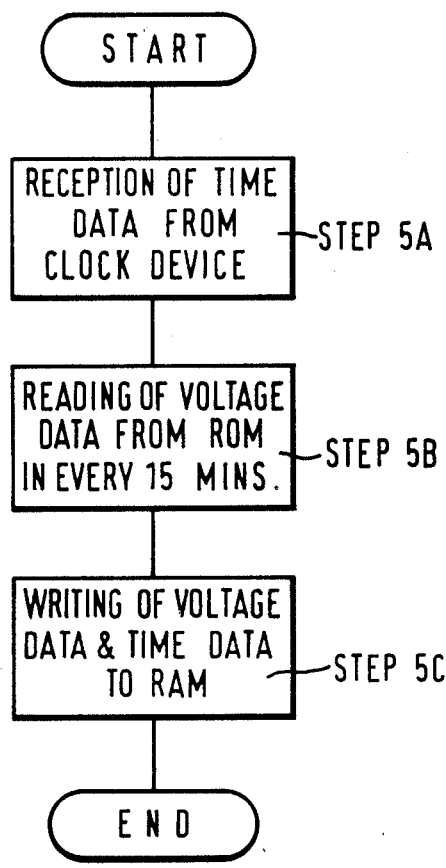
FIG. 5 is a flowchart showing a data storage operation routine performed by the system controller 12 of FIG. 4 during operation of the TV receiver.

Referring now to FIG. 5, an operation routine of the system controller 12 of the embodiment for a tuning voltage data storage to the RAM 17a will be described. FIG. 5 is a flowchart showing the tuning voltage data storage operation routine. The system controller 12 is continuously supplied with the present time data D4 from the clock device 19 (Step 5A). The system controller 12 accesses the ROM 13 in every predetermined period, e.g., fifteen minutes, for receiving a tuning voltage data D2-ch at the times (Step 5B). The system controller 12 then supplies the tuning voltage data D2-ch together with the time data D4 associated to the tuning voltage data D2-ch. Thus, the tuning voltage data D2-ch and the time data D4 are consecutively stored in the RAM 17a in every fifteen minutes (Step 5C).

An operation routine of the system controller 12 of the embodiment for storage of volume control voltage data to the RAM 17a can be performed similar to the operation routine of the tuning voltage data storage, as shown in FIG. 5.

Figure 6:
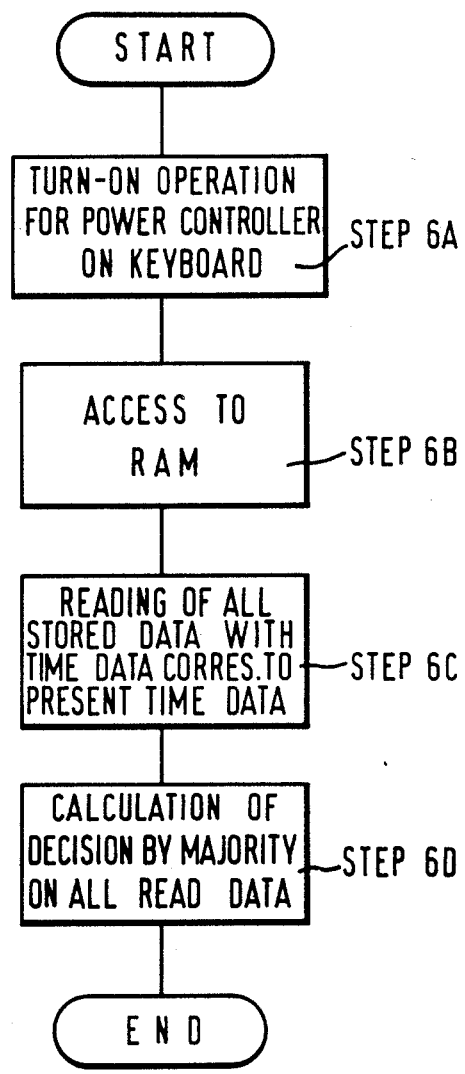
FIG. 6 is a flowchart showing an operation routine performed by the system controller 12 of FIG. 4 at the power turn-on operation of the TV receiver.

Referring now to FIG. 6, an operation routine of the system controller 12 at the power turn-on operation of the TV receiver will be described. FIG. 6 is a flowchart showing the operation routine. At the power turn-on of the TV receiver, the power controller on the keyboard 11 is operated by the user (Step 6A). Thus, a prescribed reception control data D1 associated to the power controller is applied to the system controller 12. The system controller 12 automatically accesses the RAM 17a upon receipt of the reception control data D1 (Step 6B). Then, all of prescribed tuning voltage data D2-ch, which were previously stored for a past predetermined period, with time data just or closely responding to the present time data D4 are read out from the RAM 17a (Step 6C).

All of the tuning voltage data D2-ch thus read out are applied to the arithmetic circuit 18. The arithmetic circuit 18 performs a calculation of decision by majority on all of the tuning voltage data D2-ch (Step 6D).

An automatic volume setting operation routine of the system controller 12 of the embodiment at the power turn-on operation of the TV receiver can be performed similar to the automatic channel selection routine at the power turn-on operation, as shown in FIG. 6.

Figure 7:
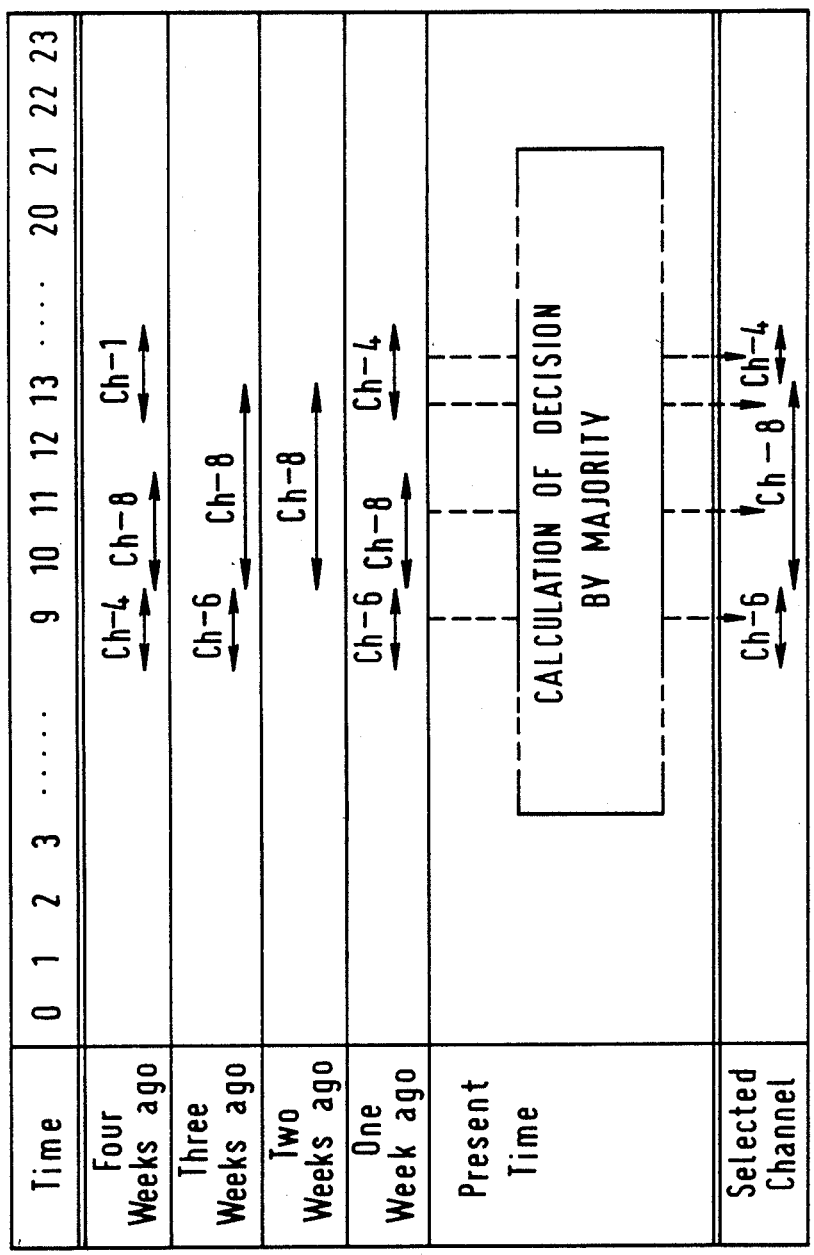
FIG. 7 is a table showing several examples of a decision by majority calculation performed by the arithmetic circuit 18 of FIG. 4.

Some examples of the calculation of decision by majority performed in the arithmetic circuit 18 are illustrated in FIG. 7. FIG. 7 is a table showing several examples of the calculation of decision by majority. As shown in FIG. 7, the TV reception channels Ch-4 and Ch-6 have been received, around nine o'clock through the past four weeks. However, the TV reception channel Ch-6 has been dominantly received around the time. Then, the arithmetic circuit 18 decides by majority to take the TV reception channel Ch-6. Thus, a dominant tuning voltage data D2-ch, e.g., the tuning voltage data D2-6 corresponding to the TV reception channel Ch-6, is output from the arithmetic circuit 18 when the power supply source of the TV receiver is turned on, around nine o'clock.

The tuning voltage data D2-ch, e.g., the tuning voltage data D2-6 output from the arithmetic circuit 18, is then applied to the tuning circuit 14 of the tuner 16. Thus, a program at the TV reception channel, e.g., Ch-6, which were dominantly received at the past times corresponding to the present time, e.g., around nine o'clock at that the power supply source of the TV receiver is turned on, is automatically received.

Figure 8:
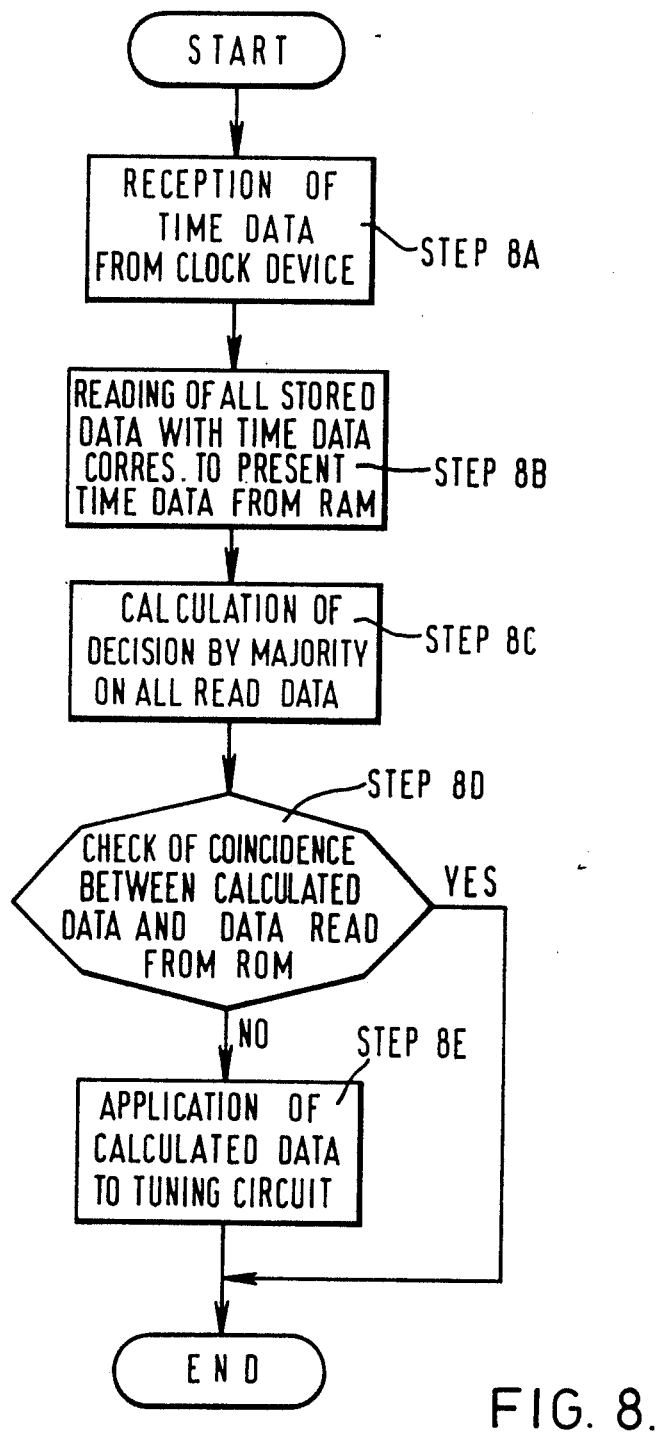
FIG. 8 is a flowchart showing an automatic reception channel selection routine performed by the system controller 12 of FIG. 4 during operation of the TV receiver.

Referring now to FIG. 8, an automatic reception channel selection routine of the system controller 12 during a normal TV reception state will be described. FIG. 8 is a flowchart showing the automatic reception channel selection routine. The system controller 12 is continuously supplied with the present time data D4 from the clock device 19 (Step 8A). The system controller 12 accesses the RAM 17a in every predetermined period, e.g., fifteen minutes, for receiving tuning voltage data D2-ch, which were previously stored for the past predetermined period, with time data just or closely responding to the present time data D4. Thus, all of the tuning voltage data D2-ch with the time data corresponding to the present time data D4 are read out from the RAM 17a (Step 8B).

All of the tuning voltage data D2-ch thus read out are applied to the arithmetic circuit 18. The arithmetic circuit 18 performs the calculation of decision by majority on all of the tuning voltage data D2-ch (Step 8C).

The calculation of decision by majority performed in the arithmetic circuit 18 during the automatic reception channel selection routine can be also described in reference to FIG. 7. As shown in FIG. 7, the TV reception channels Ch-4 and Ch-6 have been received, after nine o'clock till ten o'clock through the past four weeks. However, the TV reception channel Ch-6 has been dominantly received around the time. Then, the arithmetic circuit 18 decides by majority to take the TV reception channel Ch-6 at every check operation, e.g., at the times of 9:15, 9:30 and 9:45.

Thus, a dominant tuning voltage data D2-ch, e.g., the operation data D2-6 corresponding to the TV reception channel Ch-6 is output from the arithmetic circuit 18 until ten o'clock. The tuning voltage data D2-ch, e.g., the tuning voltage data D2-6 output from the arithmetic circuit 18 is then applied to the system controller 12. The system controller 12 compares the output from the arithmetic circuit 18, i.e., the tuning voltage data D2-6 with the other tuning voltage data D2-ch presently supplied from the ROM 13 (Step 8D). In this example, the tuning voltage data D2-6 output from the arithmetic circuit 18 coincides with the other tuning voltage data D2-ch presently supplied from the ROM 13. The system controller 12 supplies the tuning voltage data D2-6 to the tuning circuit 14 of the tuner 16. Thus, the reception of the TV channel Ch-6 is continued until ten o'clock.

According to the table of FIG. 7, only the TV reception channel Ch-8 has been received, for some hours from ten o'clock through the past four weeks. Then, the arithmetic circuit 18 decides by majority to take the TV reception channel Ch-8.

Thus, a dominant tuning voltage data D2-ch, e.g., the tuning voltage data D2-8 corresponding to the TV reception channel Ch-8, is output from the arithmetic circuit 18 when it comes to ten o'clock. The tuning voltage data D2-ch, e.g., the tuning voltage data D2-8 output from the arithmetic circuit 18, is then applied to the system controller 12. The system controller 12 compares the output from the arithmetic circuit 18, i.e., the tuning voltage data D2-8, with the other tuning voltage data D2-ch, i.e., D2-6, presently supplied from the ROM 13 (Step 8D). In this example, the tuning voltage data D2-8 output from the arithmetic circuit 18 differs from the other tuning voltage data D2-6 presently supplied from the ROM 13. Then, the system controller 12 takes the tuning voltage data D2-8 output from the arithmetic circuit 18 and supplies the tuning voltage data D2-8 to the tuning circuit 14 of the tuner 16 (Step 8E). Thus, the reception channel of the TV receiver is automatically changed to the channel Ch-8, which has been dominantly received for the past four weeks, at ten o'clock.

An automatic volume setting operation routine of the system controller 12 of the embodiment during a normal TV reception state can be performed similar to the automatic channel selection operation routine, as shown in FIG. 8.

In the embodiment of the reaction control apparatus for a TV receiver, as shown in FIG. 4, the arithmetic circuit 18 is constituted by a circulation circuit which performs the calculation of decision by majority, as described before. The arithmetic circuit 18, however, can be constituted by other known calculation circuits which perform such an operation for picking out a prescribed one from a plurality of objects. For example, the arithmetic circuit 18 can be constituted by a calculation circuit which performs a factor-load mean calculation on the operation data D2, such as the tuning voltage data D2-ch and the volume control voltage data D2-s.

In the embodiment of the reception control apparatus for a TV receiver, as shown in FIG. 4, the data storage into the RAM 17a is performed by dividing to a plurality of unit periods, such as four weeks. However, the RAM 17 can be provided for storing the operation data for a single predetermined period, e.g., a week only or a day only. In this case, every operation data stored in the RAM 17a is associated to a different time data, one by one. As a result the system controller 12 can directly access to the RAM 17a for reading out a prescribed operation data therefrom without any help of the arithmetic circuit 18.

As described above, the present invention can provide an extremely preferably reception control apparatus used for a television receiver.

While there has been illustrated and described what are at present considered to be preferred embodiments of the present invention, it will be understood by those skilled in the art that various changes and modifications may be made, and equivalents may be substituted for elements of the described preferred embodiments without departing from the true scope of the invention. In addition, many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

What is claimed is:

1. A channel selection apparatus used for a television receiver, comprising:
   power means for providing power to the channel selection apparatus;
   input means for receiving channel selection data corresponding to a channel which the television receiver is currently receiving, and for outputting reception control data in accordance with the channel selection data;
   clock means for generating successive current time data;

memory means for storing said reception control data supplied from the input means for a predetermined period together with a first one of said current time data corresponding to the predetermined period and to the reception control data to be stored;

means for controlling the memory means for writing said reception control data and said corresponding time data to the memory means and for reading out from the memory means reception control data and time data corresponding to a second one of said current time data, said clock means generating the second current time data at a time when said power means begins to provide power to the channel selection apparatus; and output means responsive to the controlling means for receiving the reception control data read out from the memory means.

2. A channel selection apparatus of claim 1, further comprising selecting means coupled to the controlling means and the memory means for selecting a reception control data from a plurality of reception control data according to said second time data.

3. A channel selection apparatus of claim 2 wherein the selecting means includes decision means for selecting by a majority method the reception control data read from the memory means.

4. A channel selection apparatus of claim 2, wherein the selecting means includes calculating means for selecting by a factor-load method the reception control data read from the memory means.

5. A channel selection apparatus of claim 1, further including means for activating the channel selection apparatus, wherein the controlling means reads the reception control data responsive to activation of the channel-selection apparatus.

6. A channel selection apparatus of claim 1, wherein the controlling means includes means for comparing said reception control data from the input means and the memory means, and means for selecting the reception control data from the memory means when both the reception control data are different from each other.

7. A channel selection apparatus of claim 1 wherein the reception control data includes a channel data.

8. A channel selection apparatus of claim 1 wherein the reception control data further includes a sound volume data.

* * * * *